Jan. 24, 1928.　　　　　　　　　　　　　　　　　　1,657,395
G. HELD
SPRAYING DEVICE FOR HEAVY OIL ENGINES
Filed Nov. 22, 1927

INVENTOR
Georges Held,
By O'Neill & Bunn
ATTORNEYS.

Patented Jan. 24, 1928.

1,657,395

UNITED STATES PATENT OFFICE.

GEORGES HELD, OF BRUSSELS, BELGIUM.

SPRAYING DEVICE FOR HEAVY OIL ENGINES.

Application filed November 22, 1927, Serial No. 234,993, and in France October 1, 1926.

My present invention relates to a spraying device for heavy oil engines, such as for instance engines of the two stroke type, described in my Patent No. 1,613,226 of January 4, 1927, which are provided with pumps for the liquid fuel supply.

It is well known that the no-load running of heavy oil engines requires the use of a special sprayer enabling complete and smokeless combustion of the fuel, when the engine is running at very slow speed. The hereto known spraying devices operate in good conditions at full load, but will not afford good results at no load or slow speeds in view of the fact that since the load decreases to zero and the speed also diminishes, the quantity of fuel supplied at each piston stroke of the fuel pump will also decrease to a great extent, so that the rate of flow of fuel from the spraying orifices will be reduced and the sprayer will atomize the fuel imperfectly.

Figure 1:
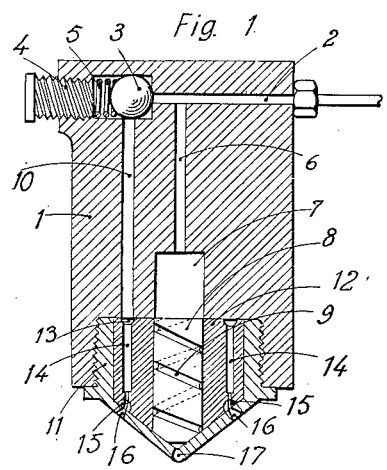
Figure 2:
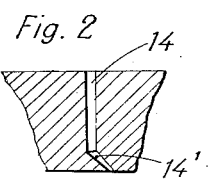

My new spraying device obviates all such defects and is described in the appended drawings in which Fig. 1 shows a vertical sectional view of one embodiment of my invention and Fig. 2 a detail sectional view.

Referring to Fig. 1, the main body 1 of my spraying device comprises at the upper part a horizontal conduit 2 connected with the fuel pump and closed at the end by a ball valve 3 whose pressure is regulated by a screw 4 acting upon the spring 5; said conduit 2 is connected with a vertical conduit 6 opening into an ejecting conduit 7 inside which is an ejecting member 8 provided with an external helical groove 9.

The vertical conduit 10 connects the said conduit 2 with the spraying orifices, when the valve 3 is displaced. To the lower part of the main body 1 is screwed a tapered member 11 having in its interior a suitable member 12, making contact with the bottom part of the recess formed in the main body 1. At the top of the member 12 is formed an annular groove 13 which connects the conduit 10 with the vertical conduits 14 formed in the member 12; said conduits lead to an annular groove 15 formed in the lower part of the member 12; said groove supplies the fuel to the tapered spraying holes 16—16 which are provided in suitable number in the tapered part of the member 11. The lower ends of the conduits 14 are obliquely pierced as shown at 14' in Fig. 2 in such manner that the fuel will be given a whirling motion in the groove 15. A central tapered hole 17 for spraying purposes is provided for the fuel supplied by the ejecting helical groove 9. The lower part of the sprayer penetrates as far as the center of the combustion chamber of the engine, as specified in my aforesaid patent.

My spraying device operates as follows: At no load, the fuel pressure cannot open the valve 3, and the fuel only enters the conduit 6 whence it proceeds through the conduit 7 and the ejecting groove 9 into the central orifice 17, whose size is such that only the no-load conditions of running will be complied with, so that the liquid fuel will enter the engine cylinder in a finely divided state, even at slow speed. When the stroke of the fuel pump increases, the pressure in the conduit 2 at once increases, and the valve 3 is lifted; the liquid fuel begins to flow through the conduit 10, and passes thence into the conduits 14; due to the inclined position of the ends 14' of said conduits the fuel is given a whirling motion so that a whirling motion will also be imparted to the liquid when issuing from the orifice 16 of the tapered part of the member 11. The fuel thus enters the engine cylinder in a finely divided state. I may however change the state of this division at will by properly selecting the angle of inclination of the conduits 14' at the end of the conduits 14, as well as the size of the annular grooved part. The time when the main sprayer is set in action depends upon the tension of the spring 5 which can be regulated by means of the screw 4 when the engine is running on test.

Claims—

1. A spraying device for heavy oil engines equipped with a fuel pump, comprising a fuel conduit connected with the fuel pump, a central spraying nozzle connected with the fuel conduit and functioning during both no-load running and normal running of the engine, a plurality of spraying openings communicating with the fuel conduit, and a valve in said fuel conduit controlling the supply of fuel to the spraying holes only during the normal running of the engine.

2. A spraying device for heavy oil engines equipped with a fuel pump, comprising a main body, a recess in the lower part of the main body, a cylindro-conical member screwed into the recess, a central nozzle at the apex of said member, a second cylindro-conical member interior to the first member and making contact with the bottom of the main body recess, an axial bore within the second member, an ejecting member inside the axial bore above the central nozzle, upper and lower annular grooves in said second member, vertical conduits connecting the grooves, a plurality of spraying openings in the first cylindro-conical member supplied by the under groove of the second member, a horizontal fuel conduit in the main body connected with the fuel pump, a central vertical conduit connecting the fuel conduit with the ejecting member, a vertical conduit through the main body connecting the fuel conduit and the upper annular groove of the second cylindro-conical member and a control valve within said second vertical conduit.

3. A spraying device for heavy oil engines equipped with a fuel pump, comprising a main body, a recess within the lower part of the main body, a cylindro-conical member screwed into the recess, a central nozzle at the apex of said member, a second cylindro-conical member interior to the first member and making contact with the bottom of the main body recess, an axial bore within the second member, an ejecting member inside the axial bore above the central nozzle, an upper and a lower annular groove provided in the second member, vertical conduits opening into the upper groove, obliquely pierced ports connecting the vertical conduits with the lower groove, a plurality of spraying openings in the first cylindro-conical member supplied by the lower groove of the second member, a horizontal fuel conduit in the main body connected with the fuel pump, a central vertical conduit connecting the fuel conduit with the ejecting member, a vertical conduit through the main body connecting the fuel conduit and the upper annular groove of the second cylindro-conical member and a control valve within said second vertical conduit.

4. A spraying device for heavy oil engines equipped with a fuel pump, comprising a main body, a recess in the lower part of the main body, a cylindro-conical member screwed into the recess, a central nozzle at the apex of said member, a second cylindro-conical member interior to the first member and making contact with the bottom of the main body recess, an axial bore within the second member, an ejecting member inside the axial bore above the central nozzle, an upper and a lower annular grooves provided into the second member, vertical conduits connecting the grooves, a plurality of spraying openings in the first cylindro-conical member supplied by the lower groove of the second member, a horizontal fuel conduit in the main body connected with the fuel pump, a central vertical conduit connecting the fuel conduit with the ejecting member, a vertical conduit through the main body connecting the fuel conduit and the upper annular groove of the second cylindro-conical member, a control valve within said second vertical conduit, and means for regulating the timing of the valve.

In testimony whereof I affix my signature.

GEORGES HELD.